United States Patent
Nguyen et al.

(10) Patent No.: US 11,703,114 B2
(45) Date of Patent: Jul. 18, 2023

(54) DIFFERENTIAL GEARBOX

(71) Applicant: Robert Bosch GmbH, Stuttgart (DE)

(72) Inventors: Ngoc-Thach Nguyen, Weinsberg (DE); Martin Schulz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 17/438,505

(22) PCT Filed: Feb. 12, 2020

(86) PCT No.: PCT/EP2020/053623
§ 371 (c)(1),
(2) Date: Sep. 13, 2021

(87) PCT Pub. No.: WO2020/182399
PCT Pub. Date: Sep. 17, 2020

(65) Prior Publication Data
US 2022/0145975 A1  May 12, 2022

(30) Foreign Application Priority Data
Mar. 12, 2019 (DE) .................. 10 2019 203 340.7

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/385* (2013.01)

(58) Field of Classification Search
CPC ..... F16H 15/08; F16H 15/40; F16H 2048/385
(Continued)

(56) References Cited

U.S. PATENT DOCUMENTS 7,294,084 B2 * 11/2007 Koehler .................. F16H 48/08
 475/230
7,465,247 B2 * 12/2008 Bock ....................... F16H 48/08
 74/606 R
(Continued)

FOREIGN PATENT DOCUMENTS

DE 102012207500 A1 11/2013
DE 102012213405 A1 5/2014
(Continued)

OTHER PUBLICATIONS

Translation of International Search Report for Application No. PCT/EP2020/053623 dated Mar. 31, 2020 (2 pages).

*Primary Examiner* — Leslie A Nicholson, III
(74) *Attorney, Agent, or Firm* — Michael Best & Friedrich LLP (57) ABSTRACT

The invention relates to a differential or transfer gearbox (10) in a motor vehicle, a method of production and the use of the differential or transfer gearbox (10). The differential or transfer gearbox (10) comprises a differential case (12) in which differential side gears (18, 20) and differential gears (22, 24) are accommodated. Each differential side gear (18) drives a first axle shaft (14) or a second axle shaft (16). A ring gear (32, 60) is driven by an input shaft (34) and mounted for conjoint rotation with the differential case (12). The ring gear (32, 60) is interlockingly connected to the differential case (12) of the differential or transfer gearbox (10).

14 Claims, 6 Drawing Sheets

(58) Field of Classification Search
USPC .......................................................... 475/331
See application file for complete search history.

(56) References Cited

U.S. PATENT DOCUMENTS

| | | | | |
|---|---|---|---|---|
| 8,562,477 | B2* | 10/2013 | Mizoguchi | F16H 48/40 |
| | | | | 475/220 |
| 8,893,575 | B2* | 11/2014 | Taniguchi | F16D 1/072 |
| | | | | 29/893 |
| 9,017,213 | B2* | 4/2015 | Taniguchi | F16H 55/17 |
| | | | | 29/513 |
| 9,068,640 | B2* | 6/2015 | Taniguchi | F16H 48/40 |
| 9,297,449 | B2* | 3/2016 | Taniguchi | F16D 1/0858 |
| 10,036,462 | B2* | 7/2018 | Wilson | F16H 48/40 |
| 2012/0325047 | A1* | 12/2012 | Cripsey | F16H 48/40 |
| | | | | 219/121.64 |
| 2013/0035196 | A1 | 2/2013 | Taniguchi et al. | |
| 2013/0074649 | A1* | 3/2013 | Taniguchi | F16H 57/023 |
| | | | | 74/606 R |
| 2016/0356372 | A1* | 12/2016 | Zalewski | F16H 48/40 |

FOREIGN PATENT DOCUMENTS

| | | |
|---|---|---|
| DE | 102015200465 A1 | 7/2016 |
| DE | 102015200667 A1 | 7/2016 |
| DE | 202017103980 U1 | 8/2017 |
| EP | 2538119 A1 | 12/2012 |
| JP | S59157149 U | 10/1984 |

* cited by examiner

DIFFERENTIAL GEARBOX

BACKGROUND OF THE INVENTION

The invention relates to a differential gearbox or a transfer gearbox for a vehicle, and also to a method for mounting a differential or transfer gearbox and to the use of the differential or transfer gearbox in a vehicle which is driven by an internal combustion engine or for use in a vehicle which has at least one electric machine as drive.

DE 10 2015 200 667 A1 relates to a clutch arrangement with an electromagnetic actuator. The clutch arrangement comprises a rotationally drivable gearbox housing which has at least one sleeve attachment for rotatable mounting in a positionally fixed housing. Also provided is an output part which is rotationally arranged in the gearbox housing, and also a clutch which is arranged in the power path between the gearbox housing and the output part. The clutch has a first clutch part, which is held in a rotationally fixed and axially movable manner relative to the gearbox housing, and a second clutch part, which is fixedly connected to the output part and is arranged in the gearbox housing. A controllable actuator for actuating the clutch is provided in such a way that the first clutch part and the second clutch part are able to be optionally connected to one another for transmitting a torque, wherein the actuator has an annular electric magnet which is arranged coaxially to the sleeve attachment of the gearbox housing and which has a magnet housing and an axially movable piston.

DE 10 2015 200 465 A1 relates to a differential device for a vehicle. The differential device comprises a first housing portion, wherein the first housing portion is designed for mounting a sungear and/or for mounting the differential device on a surrounding structure. Also provided are a second housing portion, a drive gear portion and a fastening part, wherein the fastening part, the second housing portion and the drive gear portion are connected to one another by way of a screw connection and form a screwed assembly. The screwed assembly forms a form-fitting receptacle, wherein the first housing portion is accommodated in the form-fitting receptacle.

DE 10 2012 213 405 A1 relates to a bevel gear differential for a vehicle. The bevel gear differential comprises an outer gear with a differential cage, wherein the differential cage is fixedly connected to the outer gear via at least one connecting region. The differential cage has at least one spider region on which a spider gear is arranged, wherein, in an axial plan view of the bevel gear differential, the axis of rotation of the spider gear defines a differential axial direction. In the axial plan view, a differential angular range of at least +/−20° about the differential axial direction is cropped from the at least one connecting region.

SUMMARY OF THE INVENTION

According to the invention, a differential or transfer gearbox is proposed for a vehicle, having a differential cage, in which side gears and spider gears are accommodated, wherein in each case a side gear drives a first axle shaft or a second axle shaft, and a large gearwheel driven via a drive shaft is connected to the differential cage in a rotationally fixed manner. The large gearwheel is connected to the differential cage of the differential gearbox in a form-fitting manner.

The proposed solution according to the invention makes it possible in an advantageous manner to ensure that the assembly formed by the differential or transfer gearbox is substantially lighter and additionally requires fewer components. By virtue of the solution proposed according to the invention, much simpler mounting with substantially more accurate robust centering and fixing of the individual components of the differential or transfer gearbox with respect to one another is possible.

Further following the solution proposed according to the invention, the differential cage of the differential or transfer gearbox has a number of claws which extend in the circumferential direction. The claws of the differential cage are integrated in the latter. This makes it possible to produce an easier connection, which can be produced more robustly in terms of manufacturing, between the large gearwheel or a ring gear on the one hand and the differential cage of the differential or transfer gearbox on the other hand.

Following the solution proposed according to the invention, the large gearwheel which can be used is one of solid construction, or alternatively the large gearwheel, which, according to the invention, is connected to the differential cage in a form-fitting manner, can also be configured as a ring gear.

In an advantageous manner, the large gearwheel of solid construction or the ring gear is provided with a number of cutouts which corresponds to the number of integrated claws which are formed on the differential cage. The cutouts on the large gearwheel of solid construction or on the ring gear are formed in the material thereof and extend substantially in the circumferential direction of the large gearwheel of solid construction or of the ring gear, preferably arcuately.

Further following the solution proposed according to the invention, the cutouts, configured in the number of the integrated claws corresponding to the number on the large gearwheel of solid construction or on the ring gear, are delimited by an inner cutout arc, an outer cutout arc and cutout radii. These can be produced in an extremely simple manner in manufacturing terms, which contributes to a reduction in the manufacturing costs.

Further following the solution proposed according to the invention, the claws integrated in the differential cage of the differential or transfer gearbox comprise at least one radial centering lug and at least one centering rounding which extends in the tangential direction. By virtue of the provision of the at least one radial centering lug and of the at least one centering rounding which extends in the tangential direction, the large gearwheel of solid construction or the ring gear can be centered on the differential cage in an advantageous manner.

In the mounted state of the large gearwheel of solid construction or of the ring gear and of the differential cage, there is achieved a form-fitting connection between these two components by means of caulking, in particular by producing a peel-caulking connection.

Furthermore, the present invention relates to a method for mounting a differential or transfer gearbox, wherein at least the following method steps are run through:

a. joining the large gearwheel of solid construction or the ring gear having cutouts with the claws integrated in the differential cage, b. positioning a caulking tool in each case above an integrated claw introduced into a cutout and applying a caulking force in the radial direction, c. plastically deforming the material of the claw, which is integrated in each case in the differential cage, within each cutout receiving the respective integrated claw, and d. producing a form-fitting, rotationally fixed connection between the large gearwheel of solid construction or the ring gear on the one hand and the differential cage on the other hand, in particular by peel-caulking.

The method of peel-caulking is preferably used in the method proposed according to the invention for mounting a differential or transfer gearbox.

Finally, the present invention relates to the use of the differential or transfer gearbox in a vehicle with drive by an internal combustion engine. Furthermore, the differential or transfer gearbox proposed according to the invention can be used in an electric vehicle (EV), a hybrid electric vehicle (HEV) or a plug-in hybrid vehicle (PEHV).

The differential or transfer gearbox proposed according to the invention allows a compact, simple, weight-saving design, a greater guide length and better centering and finally simpler mounting by comparison with previous solutions.

By virtue of the design proposed according to the invention, firstly the number of components is reduced, thereby leading to said weight saving. Furthermore, the differential or transfer gearbox proposed according to the invention allows a good guide length and makes possible better centering and substantially simpler mounting, since fewer mounting steps are required. With respect to the large gearwheel of solid construction and the ring gear and its connection on the differential cage, there can be achieved substantially more robust centering and fixing between said components that can be realized more simply in manufacturing terms.

By virtue of the solution proposed according to the invention, there can furthermore be achieved a better degree of transmission, and also a lower weight loading since connecting elements such as screws and bores which have to be accurately produced for manufacturing reasons can be dispensed with. Furthermore, with the solution proposed according to the invention, the machining of threaded bores and the mounting operation of screwing on can be dispensed with. The peel-caulking proposed according to the invention can, in the broadest sense, also be carried out in a highly automated manner, thereby considerably reducing the manufacturing costs of the differential or transfer gearbox proposed according to the invention.

Occurring tolerances on account of the joining of the large gearwheel of solid construction or of the ring gear with the differential cage result from the manufacturing of said components with clearance or transition fits. The two components are joined together over a relatively short radial guide length and held together by means of screw connections, which in the present context can be avoided by the solution proposed according to the invention. Furthermore, in the case of the connections between said components that were previously produced by means of screw connections, there are relatively high requirements placed on coaxiality which can be observed in a considerably simpler manner by the solution proposed according to the invention as compared with the use of screws for connection.

The cutouts in the ring gear or in the large gearwheel of solid construction are configured at the respectively occurring four corners to reduce the influence of the notch effect with smaller radii.

BRIEF DESCRIPTION OF THE DRAWINGS

The invention will be described in more detail below on the basis of the drawings, in which.

DETAILED DESCRIPTION

Figure 1:
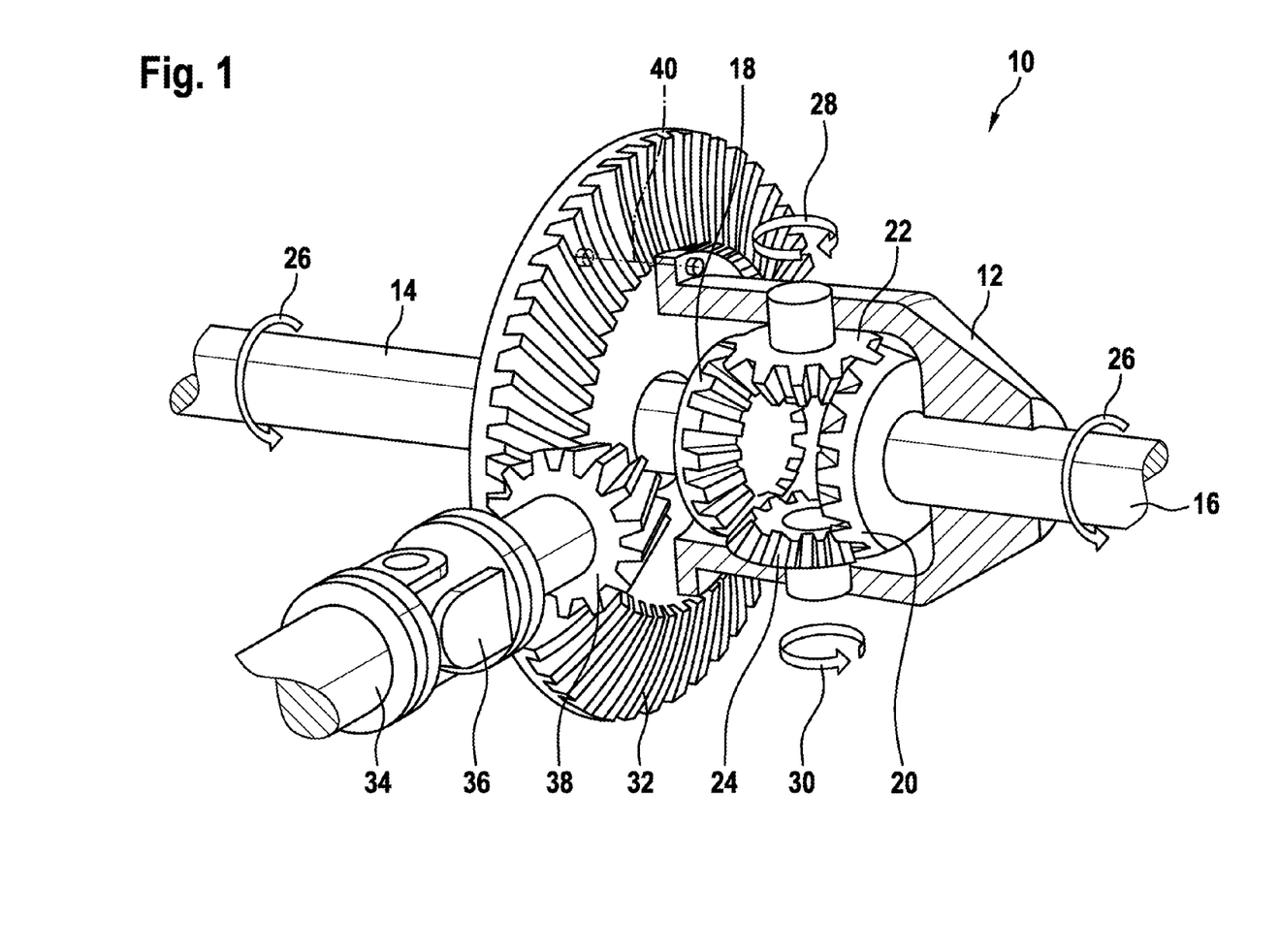
FIG. 1 shows a perspective view of a differential and transfer gearbox.

The illustration according to FIG. 1 reveals a perspective view of a differential or transfer gearbox.

FIG. 1 shows a differential gearbox 10 which comprises a differential cage 12. In the differential cage 12 there is accommodated a first side gear 18 which drives a first axle shaft 14. Also situated in the differential cage 12 is a second side gear 20 via which a second axle shaft 16 is driven. Between the first side gear 18 and the second side gear 20 there is situated on the differential cage 12 a first spider gear 22 and a second spider gear 24 via which it is possible during cornering for the different roadways to be compensated for.

Whereas a direction of rotation 26 of the two axle shafts 14 and 16 has the same direction, the first spider gear 22 rotates within the differential cage 12 in a direction of rotation 28 of the first spider gear, whereas the second spider gear 24 moves within the differential cage 12 in an opposite direction of rotation 30 of the second spider gear 24.

Furthermore, the illustration according to FIG. 1 reveals that a large gearwheel 32, which is connected to the differential cage 12 in a rotationally fixed manner, is driven via a drive shaft 34 which can comprise a universal joint 36. A drive pinion 38 received on the drive shaft 34 meshes with the large gearwheel 32. As schematically emerges from the respective illustration according to FIG. 1, the large gearwheel 32 and the differential cage 12 are connected to one another in a rotationally fixed manner via a number of connecting elements 40, here taking the form of connecting screws.

Figure 2:
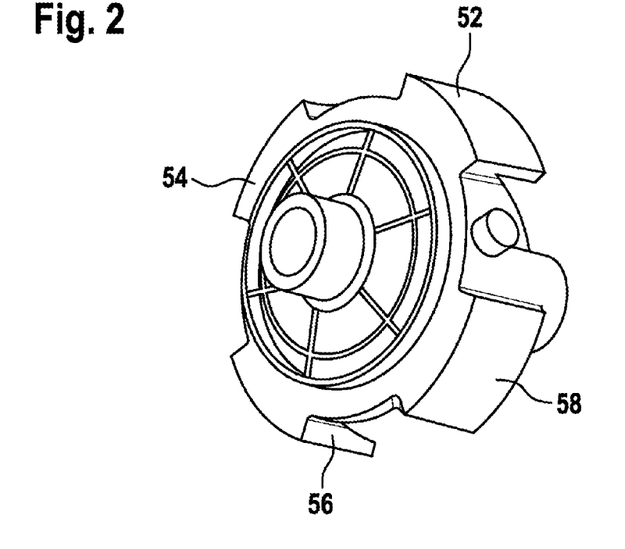
FIG. 2 shows a perspective rear view of the differential cage.

In the case of the differential and transfer gearbox 10 proposed according to the invention, use is made of a differential cage 12 according to the illustration in FIG. 2. It emerges from the perspective rear view according to FIG. 2 that integrated claws 52, 54, 56 and 58 extending in the circumferential direction are configured on the differential cage 12. The integrated claws 52, 54, 56 and 58 have a substantially arcuate profile and project vertically upwards over the circumference of the differential cage 12.

Figure 3:
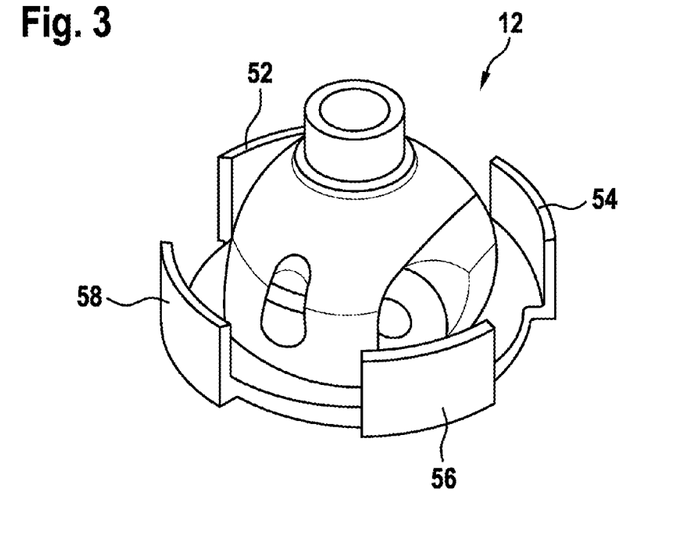
FIG. 3 shows a perspective plan view of the differential cage with integrated claws.

FIG. 3 shows a perspective plan view of the differential cage 12 according to FIG. 2.

FIG. 3 shows that the first integrated claw 52 is arranged in the 12 o'clock position, whereas the second integrated claw 54 is situated in the 3 o'clock position. Correspondingly, the third integrated claw 56 lies in the 6 o'clock position, whereas the fourth integrated claw 58 is situated in the 9 o'clock position on the differential cage 12.

Figure 4:
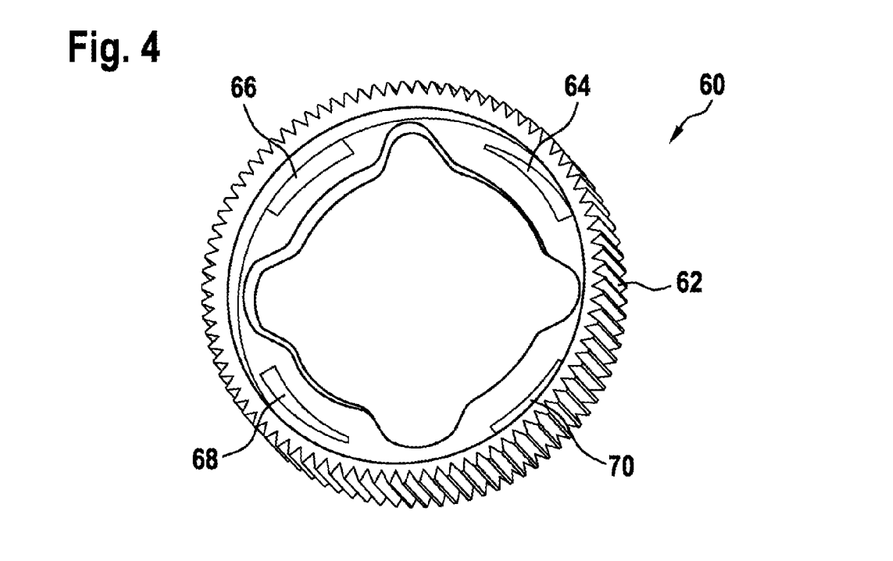
FIG. 4 shows a perspective view of a ring gear having arcuately extending cutouts.

The illustration according to FIG. 4 reveals a plan view of a ring gear 60 in more detail.

As can be gathered from the plan view according to FIG. 4, a ring gear 60 is provided in the circumferential direction with a number of cutouts 64, 66, 68 and 70. The ring gear 60 comprises on its outer circumference a toothing 62 which can take the form, for example, of a helical toothing, with the result that the running smoothness of the ring gear 60 is improved on account of the relatively large meshing ratio. FIG. 4 shows a first cutout 64, a second cutout 66, a third cutout 68 and a fourth cutout 70. The cutouts are likewise formed arcuately in a complementary manner to the arcuate shape of the integrated claws 52, 54, 56, 58 which are configured on the differential cage 12. The number of the cutouts 64, 66, 68, 70 in the ring gear 60 according to the illustration in FIG. 4 corresponds to the number of the integrated claws 52, 54, 56 and 58 which are configured in the circumferential direction in the material of the ring gear 60.

Figure 5:
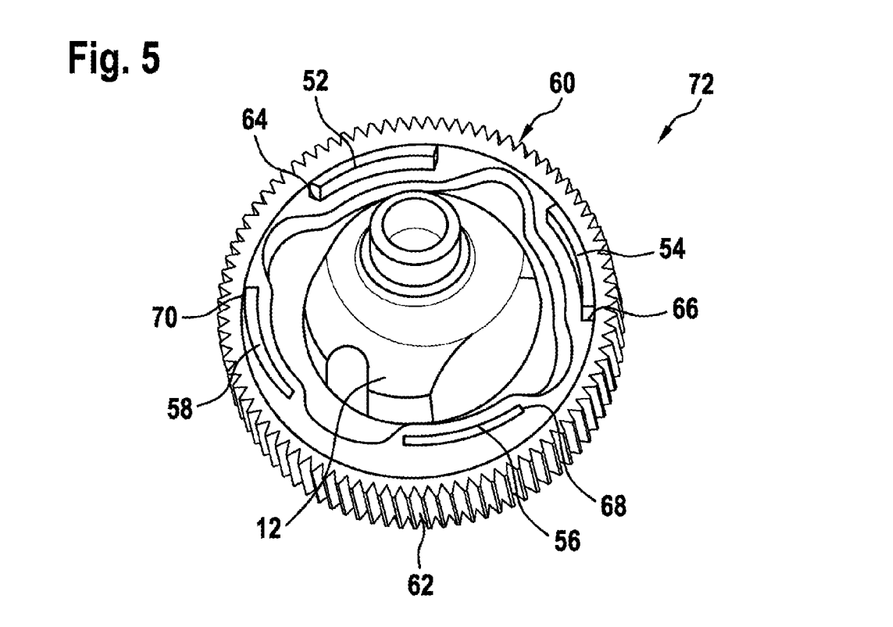
FIG. 5 shows a mounted assembly consisting of ring gear and differential cage.

FIG. 5 shows, in a perspective plan view, a mounted state of the components formed by the ring gear 60 and differential cage 12.

In the mounted state 72, the individual integrated claws 52, 54, 56, 58 of the differential cage 12 are inserted into the cutouts 64, 66, 68 and 70 of the ring gear 60. The arcuate end regions of the individual integrated claws 52, 54, 56, 58 project slightly over the upper sides of the cutouts 64, 66, 68, 70. In the mounted state 72 according to the perspective view in FIG. 5, the components formed by the ring gear 60 and differential cage 12 with integrated claws 52, 54, 56, 58 have not yet been joined with one another.

The illustrations according to FIGS. 6, 7, 8 and 9 reveal joining steps for creating a form-fitting connection between the ring gear and the differential cage 12 of the differential or transfer gearbox 10.

Figure 6:
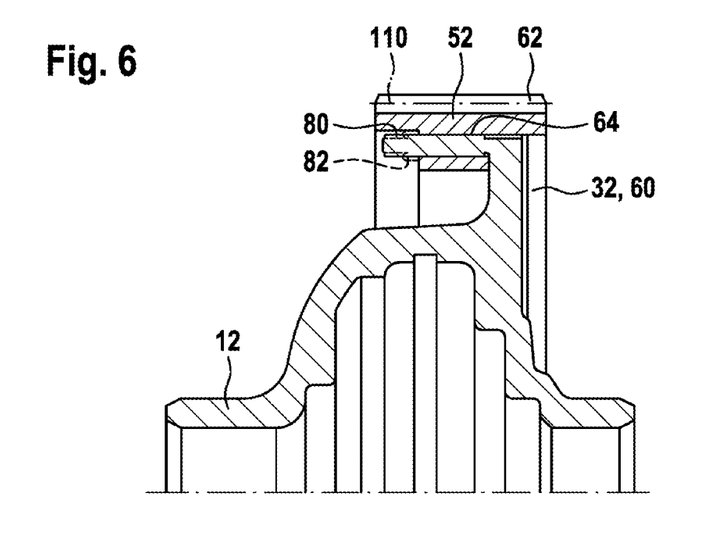
FIG. 6 shows a section through a differential cage on which a large gearwheel of solid construction or a ring gear is received.

FIG. 6 shows a longitudinal section through the differential cage 12 on which a large gearwheel 32 of solid construction or a ring gear 60 can be accommodated. In the state illustrated in FIG. 6, for example the first integrated claw 52 is inserted into a complementary first cutout 64, which extends substantially in the circumferential direction, of the large gearwheel 32 of solid construction or of the ring gear 60. As already illustrated in FIG. 5, the upper side of the first integrated claw 52 projects over the upper side of the first cutout 64. If a form-fitting connection is produced between the large gearwheel 32 of solid construction or the ring gear 60 and the first integrated claw 52 of the differential cage 12, there occurs a plastic deformation of the material of the first claw 52.

To carry out the form-fitting connection, there is present an original joining geometry 80; when caulking or peel-caulking the first integrated claw 52, this assumes a caulked joining geometry 82.

Figure 9:
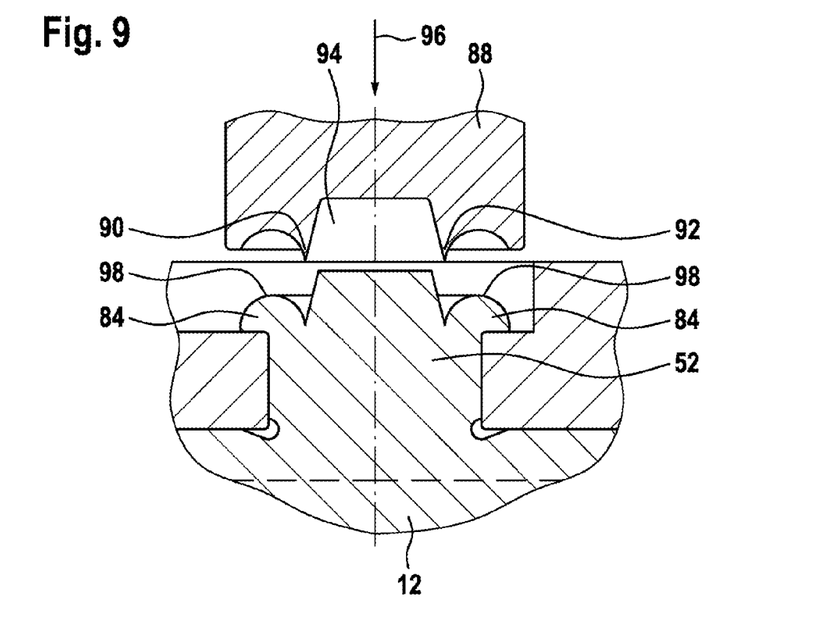
FIG. 9 shows a caulking tool by means of which a peel-caulking form-fitting connection is produced.

In the caulked joining geometry 82, the plastically deformed claw material 84, as illustrated in FIG. 9, fills the arcuate first cutout 64 extending substantially in the drawing plane according to FIG. 4.

For the sake of completeness, it should be mentioned that the toothing 62, preferably configured as a helical toothing, is situated on the outer circumference of the large gearwheel 32 of solid construction or on the ring gear 60. A toothing pitch circle diameter is designated by reference sign 110.

Figure 7:
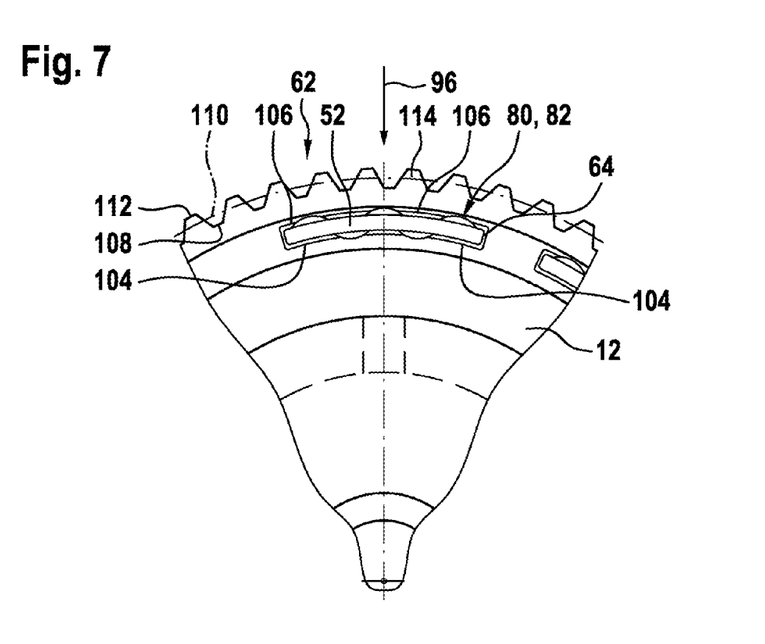
FIG. 7 shows a plan view of the arrangement according to FIG. 6.

FIG. 7 shows the plan view of the arrangement according to FIG. 6, that is to say a rotation of FIG. 6 about 90° in the drawing plane. It is illustrated in FIG. 7 that the toothing 62 is situated on the outer circumference of the large gearwheel 32 of solid construction or of the ring gear 60. This toothing comprises a number of teeth 114 which extend between a toothing root circle 108 and a toothing tip circle 112, wherein in each case a tooth 114 is delimited by two tooth flanks 116.

The plan view according to FIG. 7 illustrates how the material of the first integrated claw 52 traverses the first arcuate cutout 64 in the material of the large gearwheel 32 of solid construction or of the ring gear 60. The first cutout 64 is delimited in the illustration according to FIG. 7 by the inner cutout arc 104 and the outer cutout arc 106.

Figure 8:
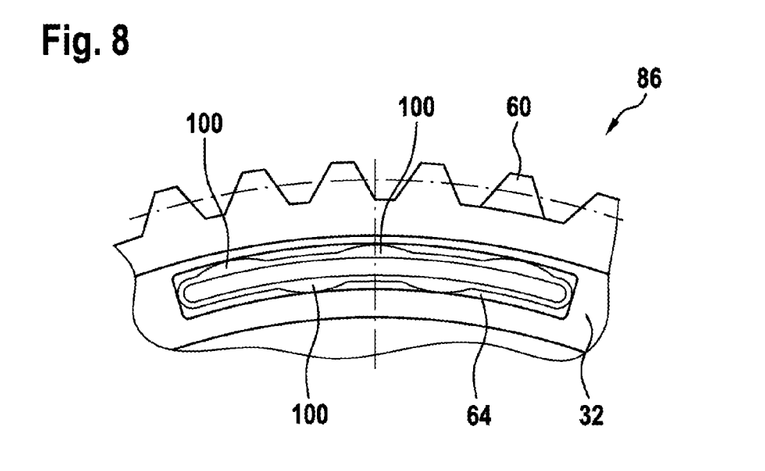
FIG. 8 shows the illustration of a nondeformed state.

The illustration according to FIG. 8 reveals that, prior to the production of the form-fitting connection between the first integrated claw 52 of the differential cage 12 and the large gearwheel 32 of solid construction or the ring gear 60, the material of the first integrated claw 52 has a number of radial centering lugs 100. Furthermore, tangential centering roundings 102 are configured on the first integrated claw 52, in each case on their arcuately opposite ends (cf. also illustration according to FIG. 11). In the starting state illustrated in FIG. 8, that is to say prior to the production of the form-fitting connection, the large gearwheel 32 of solid construction or the ring gear 60 is fixed both radially and tangentially with respect to the respective integrated claws 52, 54, 56, 58 which are formed in the material of the differential cage 12.

FIG. 9 illustrates how a caulking tool 88 is set, in a force direction 96 extending substantially in the radial direction, onto the joined-together arrangement of large gearwheel 32 of solid construction or ring gear 60 and differential cage 12. A first tip 90 and a second tip 92 are configured on that side of the caulking tool 88 which faces the large gearwheel 32 of solid construction or the ring gear 60. As viewed in the circumferential direction of the caulking tool 88, a free space 94 extends between the first tip 90 and the second tip 92. Through the action of the caulking tool 88 on the first integrated claw 52 illustrated in FIG. 9, said claw is deformed and plastically deformed claw material 84 then fills the first cutout 64, with the result that a form-fitting connection can be produced between the large gearwheel 32 of solid construction or the ring gear 60 on the one hand and the first integrated claw 52 of the differential cage 12 on the other hand. FIG. 9 shows that the plastically deformed claw material 84 extends up and into the cutout radius 98 such that the first cutout 64 extending substantially in the circumferential direction in arcuate form is completely filled by the plastically deformed claw material of the first integrated claw 52 of the differential cage 12. The same analogously applies to the pairing of the second integrated claw 54 and the second cutout 66, or the third integrated claw 56 and the third cutout 68 and also to the pairing of the fourth integrated claw 58 and the fourth cutout 70.

Figure 10:
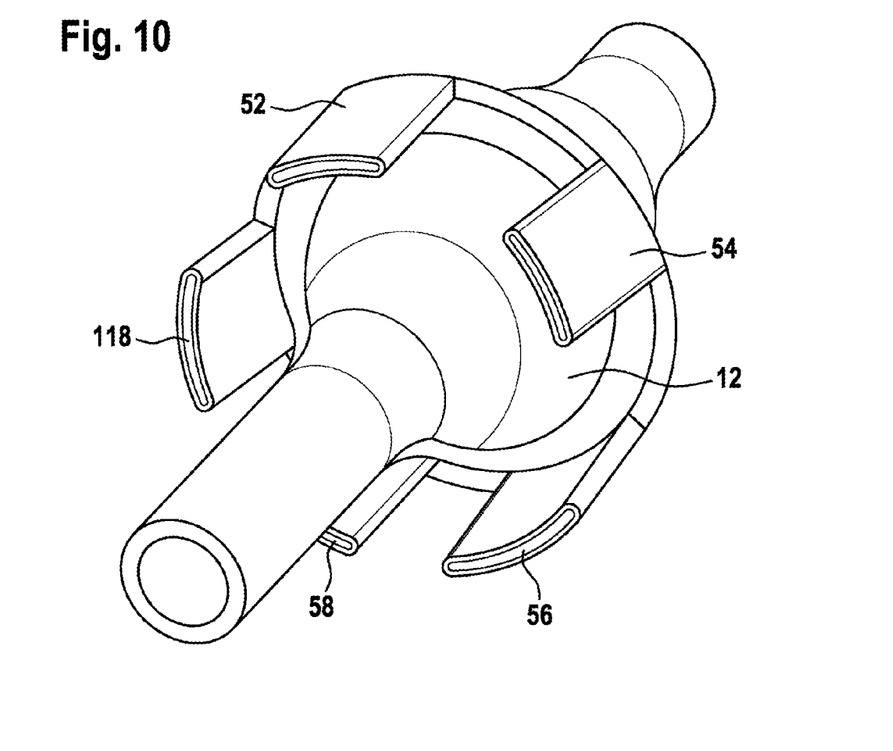
FIG. 10 shows a perspective view of a differential cage having 5 integrated claws arranged in a distributed manner in the circumferential direction.

FIG. 10 shows a perspective view of a differential cage 12 in whose circumference the first integrated claw 52, the second integrated claw 54, the third integrated claw 56 and the fourth integrated claw 58 are situated. Furthermore, the differential cage 12 has a fifth integrated claw 118 according to the perspective view in FIG. 10.

Figure 11:
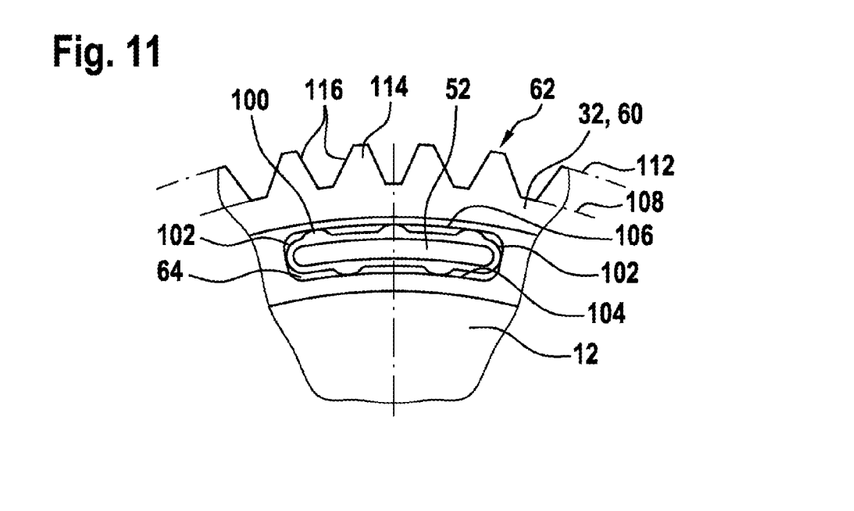
FIG. 11 shows a detail view of an integrated claw, received in a cutout, of a differential cage.

The illustration according to FIG. 11 shows that the first integrated claw 52 is inserted in the still nondeformed state into the first cutout 64. In this state, the differential cage 12 on the one hand and the large gearwheel 32 of solid construction or the ring gear 60 on the other hand are centered with respect to one another in the radial and tangential direction. FIG. 11 shows that the radial centering lugs 100 situated on the upper side—as viewed in the radial direction—of the first integrated claw 52 bear against the outer cutout arc 106 of the first cutout 64, whereas the two radial centering lugs 100 formed spaced apart from one another on the underside of the first integrated claw 52 bear against the inner cutout arc 104 of the first cutout 64. FIG. 11 further shows that the tangential centerings provided at the mutually opposite ends of the first cutout 64 likewise bear against the boundary surfaces of the first cutout 64. In FIG. 11, no plastic deformation of the claw material of the first integrated claw 52 has yet taken place.

FIG. 11 further shows the toothing 62 which is formed on the circumference of the large gearwheel 32 of solid construction or on the ring gear 60 and which is formed by a number of teeth 114 which are each delimited by tooth flanks 116. Reference sign 108 designates the toothing root circle, whereas the toothing tip circle of the toothing 62 is formed by 112. The invention further comprises a method for mounting a differential or transfer gearbox 10, wherein at least the following method steps are run through during the mounting of the differential or transfer gearbox 10: first of all, the large gearwheel 32, configured to be of solid construction, or the ring gear 60 having cutouts 64, 66, 68, 70 is joined with the claws 52, 54, 56, 58, 118 integrated in the differential cage 12. This is followed by the positioning of a caulking tool 88 in each case above an integrated claw 52, 54, 56, 58, 118 introduced into a cutout 64, 66, 68, 70 and the application of a caulking force acting in the radial direction 96. There then follows a plastic deformation 84 of the material of the respective integrated claw 52, 54, 56, 58, 118 within the respective cutout 64, 66, 68, 70. There occurs the production of a form-fitting rotationally fixed connection between the large gearwheel 32 of solid construction or the ring gear 60 on the one hand and the differential cage 12 on the other hand, in particular by carrying out a peel-caulking operation.

By virtue of the design, illustrated above by way of FIGS. 1 to 11, of the differential and transfer gearbox 10 proposed according to the invention, the number of components can be reduced, with the result that the assembly of the differential and transfer gearbox 10 becomes lighter. As a result of the integrated claws 52, 54, 56, 58 and 118 which extend in the circumferential direction, the guide length is considerably improved, and it is also possible, by the provision of a number of radial centering lugs 100 on the claws 52, 54, 56, 58, to achieve a substantially better centering prior to carrying out the peel-caulking operation. The formation thereof is relatively simple, since the centering in the tangential and axial direction is maintained during the peel-caulking operation. The design of the differential and transfer gearbox 10 proposed according to the invention allows a better transmission efficiency and a lower weight loading to be achieved, since fewer components are required. In an advantageous manner, the integrated claws 52, 54, 56, 58 are formed in a circumferential length which preferably corresponds to the width of the toothing 62 of the ring gear 60 or of the large gearwheel 32 of solid construction. This provides good axial and radial guide behavior of the large gearbox 32 of solid construction or of the ring gear 60. The tangential centering roundings 102 situated at the end of the integrated claws 52, 54, 56, 58 improve the tangential centering accuracy.

The above invention is not limited to the exemplary embodiments described here and to the aspects highlighted therein. Rather, a large number of modifications forming part of the practice of a person skilled in the art are possible within the scope indicated by the claims.

The invention claimed is:

1. A differential or transfer gearbox (10) for a vehicle, the gearbox (10) comprising a differential cage (12), in which side gears (18, 20) and spider gears (22, 24) are accommodated, wherein in each case a side gear (18, 20) drives a first axle shaft (14) or a second axle shaft (16), and the gearbox (10) comprising a large gearwheel (32, 60), which is driven via a drive shaft (34), and which is connected to the differential cage (12) in a rotationally fixed manner,
   wherein the large gearwheel (32, 60) is connected to the differential cage (12) of the differential or transfer gearbox (10) in a form-fitting manner,
   wherein the differential cage (12) has a number of integrated claws (52, 54, 56, 58, 118) which extend in a circumferential direction,
   wherein the large gearwheel (32) has a number of cutouts (64, 66, 68, 70) which corresponds to the number of claws (52, 54, 56, 58, 118) integrated in the differential cage (12),
   wherein the cutouts (64, 66, 68, 70) are each delimited by an inner cutout arc (104), an outer cutout arc (106) and cutout radii (98).

2. The differential or transfer gearbox (10) as claimed in claim 1, wherein the large gearwheel (32) is configured with a solid construction or as a ring gear (60).

3. The differential or transfer gearbox (10) as claimed in claim 2, wherein the cutouts (64, 66, 68, 70) extend substantially arcuately in a circumferential direction in a material of the large gearwheel (32) of solid construction or of the ring gear (60).

4. The differential or transfer gearbox (10) as claimed in claim 1, wherein the claws (52, 54, 56, 58, 118) integrated in the differential cage (12) have at least one radial centering lug (100) and at least one tangential centering rounding (102).

5. The differential or transfer gearbox (10) as claimed in claim 2, wherein, in a mounted state (72), the large gearwheel (32) of solid construction or the ring gear (60) are caulked with the differential cage (12) in a formfit with one another.

6. A method for mounting a differential or transfer gearbox (10) as claimed in claim 1, the method comprising the following method steps:
   a. joining the large gearwheel (32) having cutouts (64, 66, 68, 70) with the claws (52, 54, 56, 58, 118) integrated in the differential cage (12),
   b. positioning a caulking tool (88) in each case above an integrated claw (52, 54, 56, 58, 118) introduced into a cutout (64, 66, 68, 70) and applying a caulking force in a radial direction (96),
   c. plastically deforming (84) a material of the respective integrated claw (52, 54, 56, 58, 118) within the respective cutout (64, 66, 68, 70), and
   d. producing a form-fitting, rotationally fixed connection between the large gearwheel (32) on the one hand and the differential cage (12) on the other hand.

7. A vehicle comprising the differential or transfer gearbox (10) as claimed in claim 1.

8. The vehicle as claimed in claim 7, wherein the vehicle is driven by an internal combustion engine.

9. The vehicle as claimed in claim 7, wherein the vehicle is an electric vehicle (EV).

10. The vehicle as claimed in claim 7, wherein the vehicle is a hybrid electric vehicle (HEV).

11. The vehicle as claimed in claim 7, wherein the vehicle is a plug-in hybrid vehicle (PHEV).

12. The differential or transfer gearbox (10) as claimed in claim 2, wherein, in a mounted state (72), the large gearwheel (32) of solid construction or the ring gear (60) and the differential cage (12) are peel-caulked with one another.

13. The method for mounting a differential or transfer gearbox (10) as claimed in claim 6, wherein the form-fitting, rotationally fixed connection between the large gearwheel (32) and the differential cage (12) is produced by peel-caulking.

14. A differential or transfer gearbox (10) for a vehicle, the gearbox (10) comprising a differential cage (12), in which side gears (18, 20) and spider gears (22, 24) are accommodated, wherein in each case a side gear (18, 20) drives a first axle shaft (14) or a second axle shaft (16), and the gearbox (10) comprising a large gearwheel (32, 60), which is driven via a drive shaft (34), and which is connected to the differential cage (12) in a rotationally fixed manner,
- wherein the large gearwheel (32, 60) is connected to the differential cage (12) of the differential or transfer gearbox (10) in a form-fitting manner,
- wherein the differential cage (12) has a number of integrated claws (52, 54, 56, 58, 118) which extend in a circumferential direction,
- wherein the claws (52, 54, 56, 58, 118) integrated in the differential cage (12) have at least one radial centering lug (100) and at least one tangential centering rounding (102).

\* \* \* \* \*